United States Patent [19]
Jackson

[11] Patent Number: 6,067,699
[45] Date of Patent: May 30, 2000

[54] METHOD FOR ASSEMBLING A MULTI-PANEL DOOR

[75] Inventor: Charles R. Jackson, Oshkosh, Wis.

[73] Assignee: Jeld-Wen, Inc., Klamath Falls, Oreg.

[21] Appl. No.: 08/918,158

[22] Filed: Aug. 25, 1997

Related U.S. Application Data

[63] Continuation of application No. 08/423,446, Apr. 19, 1995, abandoned.

[51] Int. Cl.[7] ..................................... B23P 21/00
[52] U.S. Cl. .............................. 29/430; 29/469; 144/344; 144/347; 144/352; 156/304.5
[58] Field of Search ............................. 29/429, 430, 469, 29/771, 772, 822; 144/344, 346, 347, 352, 354; 156/304.1, 304.5

[56] References Cited

U.S. PATENT DOCUMENTS

| | | | |
|---|---|---|---|
| 2,574,163 | 11/1951 | Bamford, Sr. | 29/430 X |
| 2,825,099 | 3/1958 | Simmons . | |
| 3,399,445 | 9/1968 | Carroll | 29/430 X |
| 3,546,831 | 12/1970 | Romo et al. | 29/429 X |
| 3,557,439 | 1/1971 | Dykeman | 29/772 X |
| 3,574,920 | 4/1971 | Stirling | 29/430 |
| 3,601,882 | 8/1971 | McRae | 29/430 X |
| 3,731,444 | 5/1973 | Tobin . | |
| 3,897,620 | 8/1975 | Wright | 29/430 |
| 3,962,773 | 6/1976 | van der Lely | 29/430 |
| 3,968,560 | 7/1976 | Vial | 29/822 X |
| 3,986,247 | 10/1976 | Kellner | 29/430 |
| 4,060,437 | 11/1977 | Strout . | |
| 4,078,295 | 3/1978 | Koller | 29/429 |
| 4,097,100 | 6/1978 | Sauder . | |
| 4,175,313 | 11/1979 | Neumann | 29/430 |
| 4,387,545 | 6/1983 | Kern . | |
| 4,546,530 | 10/1985 | Rizk | 29/772 X |
| 4,716,705 | 1/1988 | Formanek et al. . | |
| 4,870,797 | 10/1989 | Hagemeyer . | |
| 5,188,276 | 2/1993 | Furuya et al. | 29/430 X |
| 5,218,807 | 6/1993 | Fulford . | |
| 5,771,656 | 6/1998 | Amoretti | 144/344 X |

FOREIGN PATENT DOCUMENTS

| | | | |
|---|---|---|---|
| 56-39844 | 4/1981 | Japan | 29/430 |
| 178132 | 8/1986 | Japan | 29/469 |

*Primary Examiner*—Joseph M. Gorski
*Attorney, Agent, or Firm*—Foley & Lardner

[57] ABSTRACT

A method and apparatus for assembling a multi-panel door. The method includes the steps of fashioning a plurality of rails; fashioning a plurality of panels; fashioning a plurality of mullions; fashioning a plurality of stiles; and preassembling selected rails, selected panels, and selected mullions into sub-assemblies of the door. The sub-assemblies are positioned intermediate a first stile and a second stile in a pre-assembly orientation with the first stile and second stile generally coplanar with the sub-assemblies. The sub-assemblies, the first stile, and the second stile are compressively urged together in two substantially perpendicular axes to create a squared assembly with respect to the two axes. The sub-assemblies are intermediate the first stile and the second stile and are affixed to the first stile along at least a portion of the first stile, and are affixed to the second stile along at least a portion of the second stile.

19 Claims, 6 Drawing Sheets

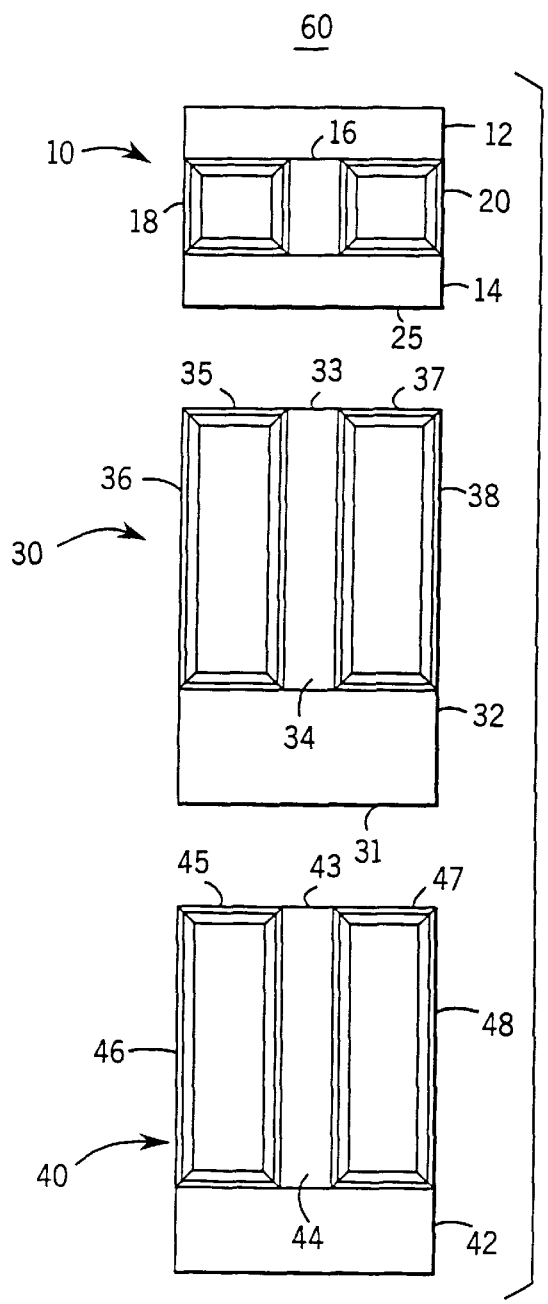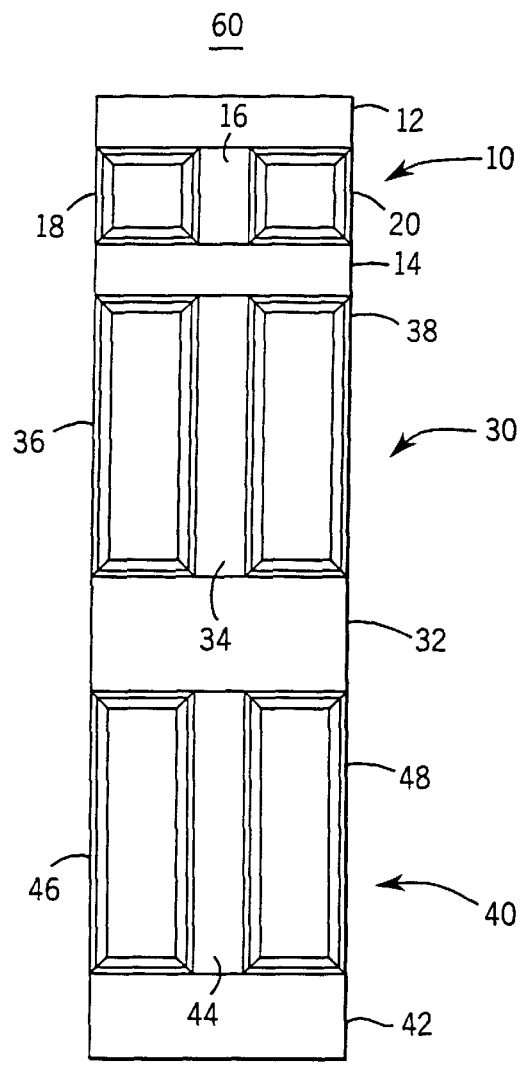
FIG. 4a
FIG. 4b

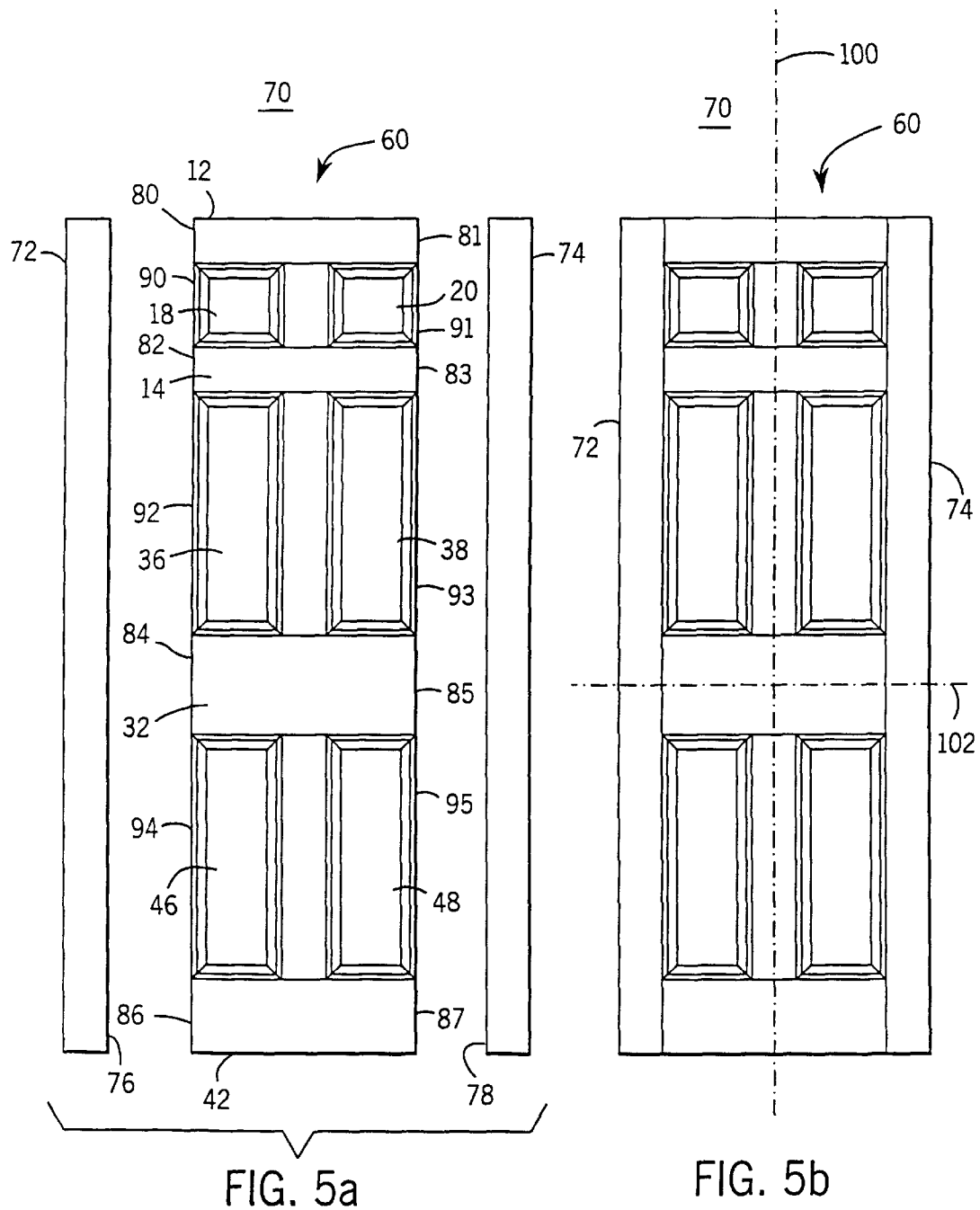

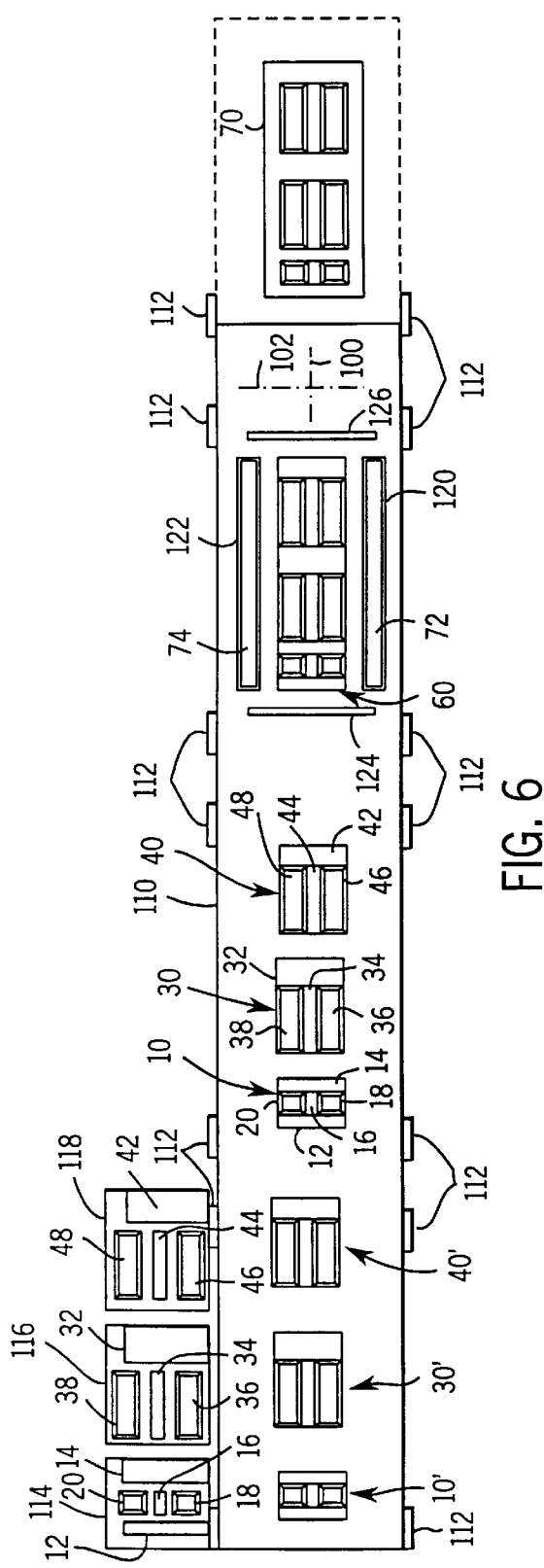
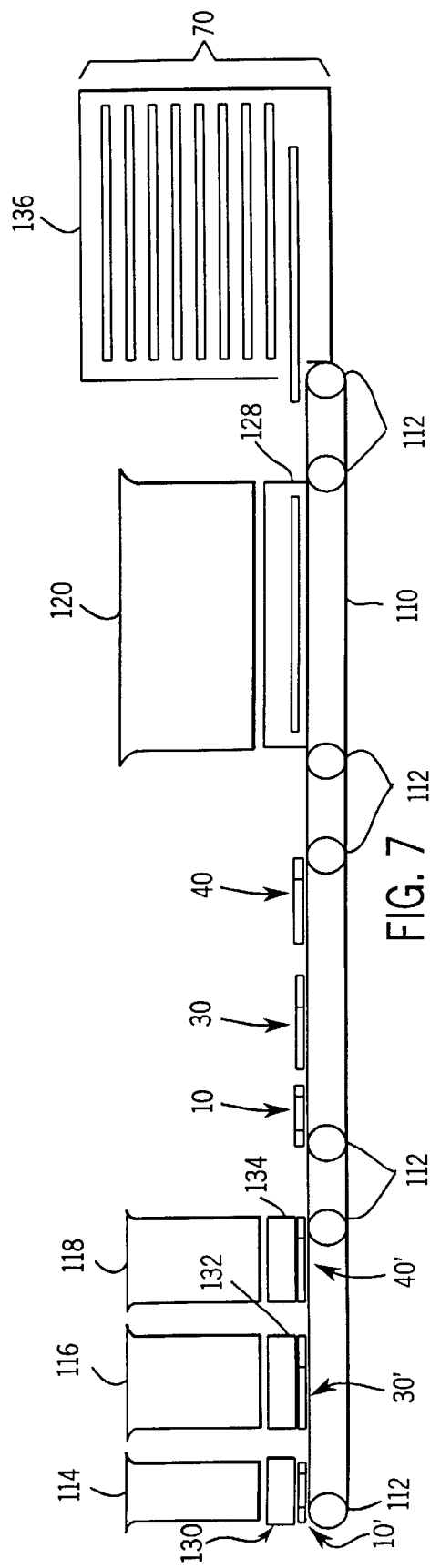
FIG. 6
FIG. 7

METHOD FOR ASSEMBLING A MULTI-PANEL DOOR

This is a continuation of application Ser. No. 08/423,466 filed Apr. 19, 1995 abandoned.

BACKGROUND OF THE INVENTION

The present invention relates to a method and apparatus for assembling a door, especially a multi-panel door. The method and apparatus of the present invention are particularly suited to manufacture of a multi-panel wooden door.

Wooden doors have been manufactured and sold for many years and have classic, accepted designs well-known in the industry. A particularly well-known design is the classic six-panel door which provides a plurality of rails (horizontally oriented bar members), a plurality of mullions (vertically oriented bar members intermediate the rails), and stiles (vertically oriented side members affixed substantially along the full length of the assembled door). Thus, a standard six-panel door will include four rails, three mullions, two stiles, and six panels. The six panels are engaged intermediate a respective pair of rails in a vertical axis, and intermediate a respective mullion and a respective stile in a horizontal axis. Preferably, the panels are only nestingly engaged with their adjacent rails, mullion, and stile in a manner which allows them to "float" to accommodate expansion and contraction of the wooden adjacent members (i.e., adjacent rails, mullion, and stile) with changes in temperature and humidity.

In the past such six-panel doors have been manufactured by hand one at a time by assembling the various panels, mullions, rails, and stiles at a single assembly operation and pressing them together. The various components which are fixed with respect to each other employ various affixation methods, such as dowels and adhesives, threaded fasteners, or other fastening methods. Dowels and adhesives have been used, for example, to affix the stiles to the remainder of the door, maintaining pressure among the various components of the door until the adhesive is sufficiently set, and then removing the finished door from the one-at-a-time assembly frame to begin another subsequent one-at-a-time assembly operation for a next door.

The benefits of in-line assembly for various mechanical operations ranging from automotive assembly to other mechanical assemblies have long been known in the art of manufacture. However, no one to date has applied in-line assembly techniques to manufacture of a multi-panel door. To preposition sufficient components (i.e., rails, mullions, panels, and stiles) at appropriate locations along an assembly line, and provide automated feeding mechanisms for selecting appropriate such components to assemble sub-assemblies of a door are novel advances in multi-panel door manufacturing. To position those subassemblies of the finished door in appropriate locations along the assembly line for subsequent incorporation into a completed door as the several sub-assemblies progress along the assembly line via a conveyor system all contribute to efficiencies advantageously and uniquely employed by the present invention to efficiently assembly multi-panel doors, especially six-panel wooden doors.

Other door designs are equally amenable to construction by in-line assembly methods and apparata. For example, two-, three-, and four-panel doors may be constructed in such a manner and with such equipment. Such door designs may, for example, employ only rails, panels, and stiles, and no mullions.

There is a need for such greater efficiency in assembling multi-panel doors, especially six-panel wooden doors.

SUMMARY OF THE INVENTION

The present invention is a method for assembling a multi-panel door, especially a six-panel wooden door. The method includes the steps of fashioning a plurality of rails; fashioning a plurality of panels; fashioning a plurality of mullions; fashioning a plurality of stiles; and preassembling selected rails of the plurality of rails, selected panels of the plurality of panels, and selected mullions of the plurality of mullions into sub-assemblies of the door. Each respective sub-assembly has at least one respective selected rail, at least one respective selected panel, and at least one respective selected mullion interference fitted to effect the sub-assembly.

The method further includes the step of positioning the sub-assemblies intermediate a first stile and a second stile of the plurality of stiles in a pre-assembly orientation. The sub-assemblies, the first stile, and the second stile are generally coplanar in the pre-assembly orientation.

The method still further includes the step of effecting compressive urging together of the sub-assemblies, the first stile, and the second stile in two substantially perpendicular axes. The compressive urging substantially seats the sub-assemblies, the first stile, and the second stile in a substantially squared assembly with respect to the two axes. The sub-assemblies are affixed to the first stile along at least a portion of the first stile, and are affixed to the second stile along at least a portion of the second stile. The sub-assemblies are intermediate the first stile and the second stile in the assembled door. Preferably, the sub-assemblies may also be individually squared with respect to the two axes before compression for seating and squaring in assembly with the stiles.

The present invention also includes an apparatus for assembling a multi-panel door, especially a six-panel wooden door. The apparatus includes rail storage means for storing a plurality of rails; panel storage means for storing a plurality of panels; mullion storage means for storing a plurality of mullions; stile storage means for storing a plurality of stiles; and pre-assembly means for pre-assembling selected rails of the plurality of rails, selected panels of the plurality of panels, and selected mullions of the plurality of mullions into sub-assemblies of the door. The pre-assembly means is in communication with the rail storage means, the panel storage means, and the mullion storage means. The pre-assembly means receives the selected rails from the rail storage means, receives the selected panels from the panel storage means, and receives the selected mullions from the mullion storage means. Each respective sub-assembly has at least one respective selected rail, at least one respective selected panel, and at least one respective selected mullion interference fitted to effect the sub-assembly.

The apparatus further includes positioning means for positioning the sub-assemblies intermediate a first stile and a second stile of the plurality of stiles in a pre-assembly orientation. The positioning means is in communication with the pre-assembly means and with the stile storage means. The positioning means receives the first stile and second stile from the stile storage means, and receives the sub-assemblies from the pre-assembly means. The sub-assemblies, the first stile, and the second stile are generally coplanar in the pre-assembly orientation. The positioning means effects compressive urging together of the subassemblies, the first stile, and the second stile in two substantially perpendicular axes. The compressive urging substantially seats the sub-assemblies, the first stile, and the second stile in a squared generally planar assembly. The sub-assemblies are affixed to the first stile along at least a portion of the first stile, and are affixed to the second stile along at least a portion of the second stile. The sub-assemblies are intermediate the first stile and the second stile in the assembled door. Preferably, the sub-assemblies may also be individually squared with respect to the two axes before compression for seating and squaring in assembly with the stiles. Also preferably, each respective component of each respective sub-assembly is stored in and dispensed from its own respective storage means.

It is, therefore, an object of the present invention to provide a method and apparatus for assembling a multi-panel door which incorporate in-line manufacturing techniques to realize efficiencies by such manufacture of multi-panel doors.

Further objects and features of the present invention will be apparent from the following specification and claims when considered in connection with the accompanying drawings illustrating the preferred embodiment of the invention configured, for exemplary purposes, for manufacturing six-panel doors.

BRIEF DESCRIPTION OF THE DRAWINGS

FIG. 1 is a plan view of a first sub-assembly of a door.

FIG. 2 is a plan view of a second sub-assembly of a door.

FIG. 3 is a plan view of a third sub-assembly of a door.

FIG. 4 is a plan view of a door component which incorporates the first, second, and third sub-assemblies illustrated in FIGS. 1–3; FIG. 4(a) illustrates the door component in an exploded view; FIG. 4(b) illustrates the door component in an assembled orientation.

FIG. 5 is a plan view of an assembled door; FIG. 5(a) illustrates the door in an exploded view; FIG. 5(b) illustrates the door in an assembled orientation.

FIG. 6 is a top schematic view of an apparatus for assembling the door of the present invention according to the method of the present invention.

FIG. 7 is a side schematic view of an apparatus for assembling the door of the present invention according to the method of the present invention.

DETAILED DESCRIPTION OF THE INVENTION

Figure 1A:
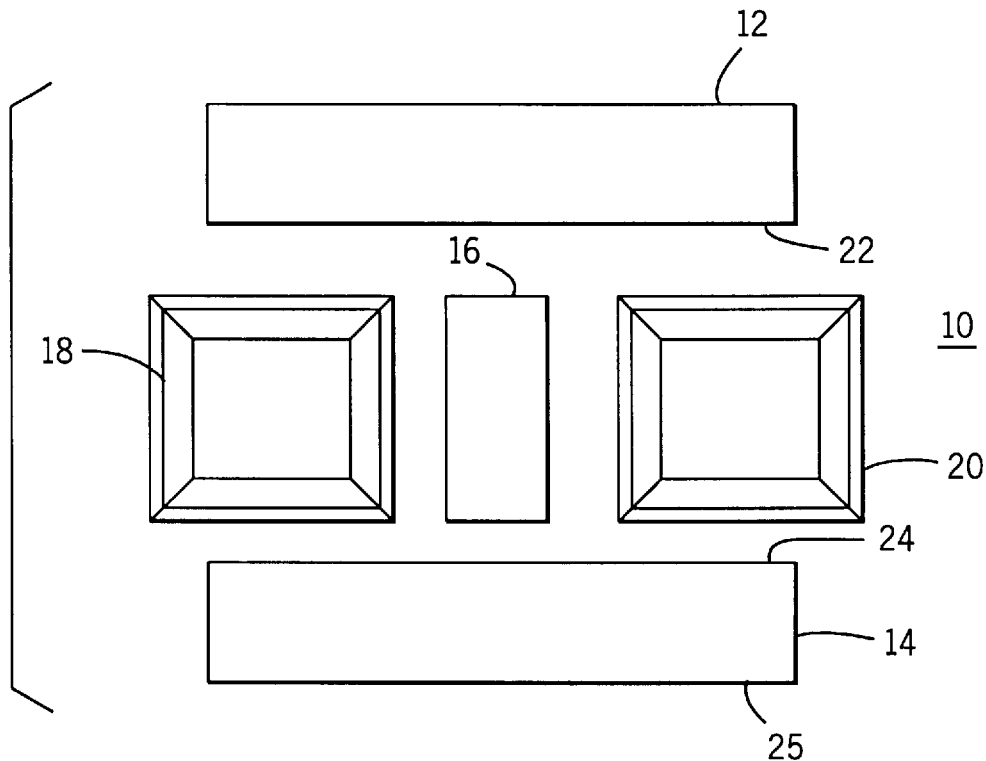
FIG. 1(a) is an exploded view of the first sub-assembly.
Figure 1B:
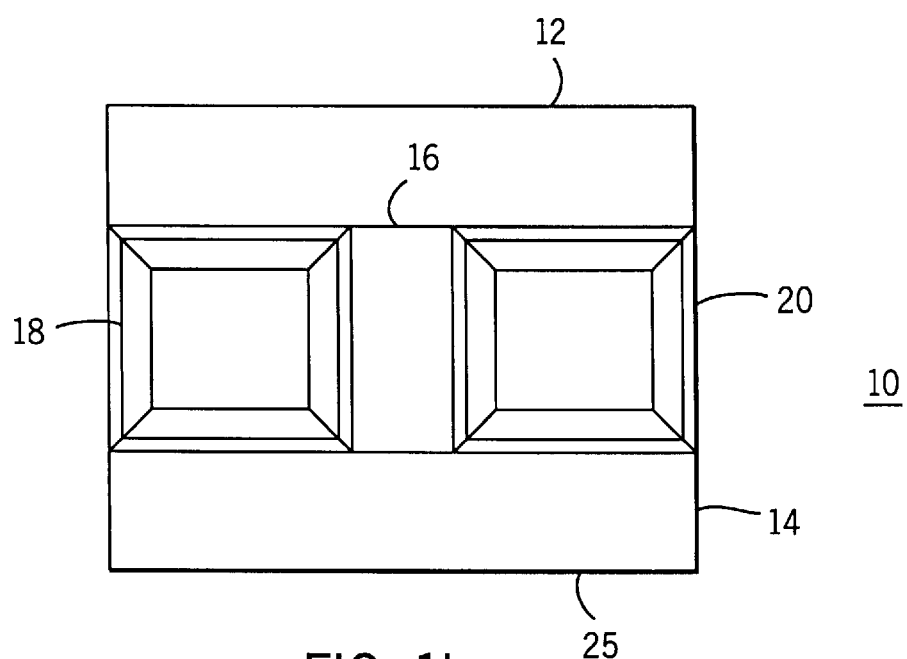
FIG. 1(b) illustrates the first sub-assembly in an assembled orientation.

FIG. 1 is a plan view of a first sub-assembly of a door; FIG. 1(a) is an exploded view of the first sub-assembly; FIG. 1(b) illustrates the first subassembly in an assembled orientation.

In order to facilitate understanding the present invention, like elements will be indicated by like reference numerals in the various drawings.

In FIG. 1, a first sub-assembly 10 is illustrated as including a first top rail 12 and a second top rail 14. Intermediate first top rail 12 and second top rail 14 is a top mullion 16. Also intermediate first top rail 12 and second top rail 14 are a first top panel 18 and a second top panel 20. When first sub-assembly 10 is assembled, as illustrated in FIG. 1(b), first top rail 12 receives first top panel 18, second top panel 20, and top mullion 16 along its bottom side 22 in an interference-fit relation. The interference-fit relation may be effected, for example, by a tab (not shown) extending from each of top mullion 16, first top panel 18, and second top panel 20, each of which tabs is nestingly received in a facing slot (not shown) presented at bottom side 22 of first top rail 12.

For purposes of this disclosure, the term "interference-fit" means any fit between two components which substantially maintains the relative positions of the components by reason of an interfitting friction established between the two components. Such an interfitting friction may be established by physical dimensions of a slot and a tab fitting within the slot, by providing a straight slot and a slightly curved interfitting component, or by other friction producing interactive fitting arrangements.

Similarly, top mullion 16, first top panel 18, and second top panel 20 are interference-fittingly received in top side 24 of second top rail 14. In such manner, in its assembled condition, first sub-assembly 10 includes first top rail 12 and second top rail 14 interference-fittingly engaged with top mullion 16, first top panel 18 and second top panel 20. When a door which includes first sub-assembly 10 is finally assembled, top mullion 16, first top panel 18 and second top panel 20 will "float" by their interference-fit engagement with first top-rail 12, second top rail 14, and stiles (to be described hereinafter) to accommodate expansion and contraction of the material (such as wood) of which first sub-assembly 10 and other sub-assemblies comprising the door are manufactured. Such expansion and contraction is known to occur in some materials, such as wood, in response to changes in temperature and changes in humidity.

Figure 2A:
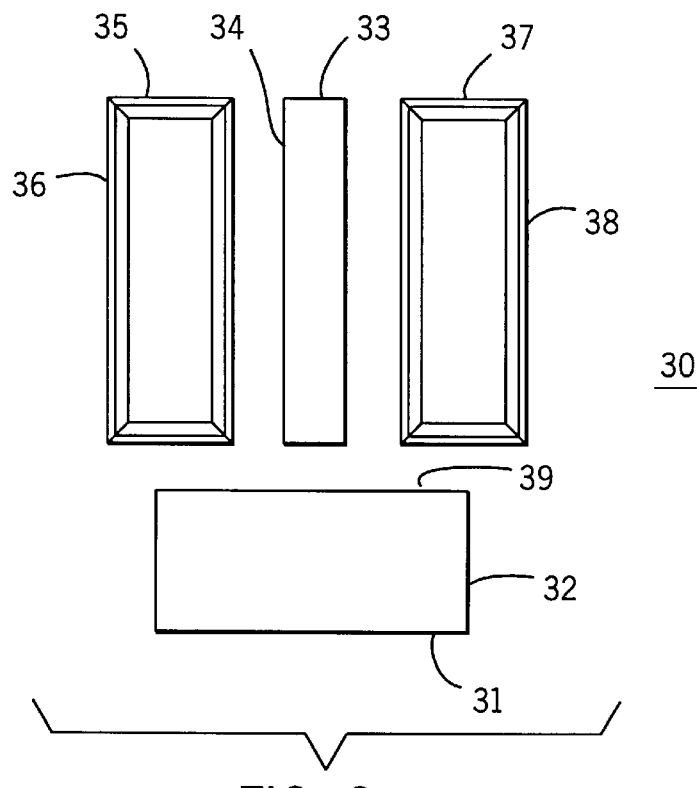
FIG. 2(a) is an exploded view of the second sub-assembly.
Figure 2B:
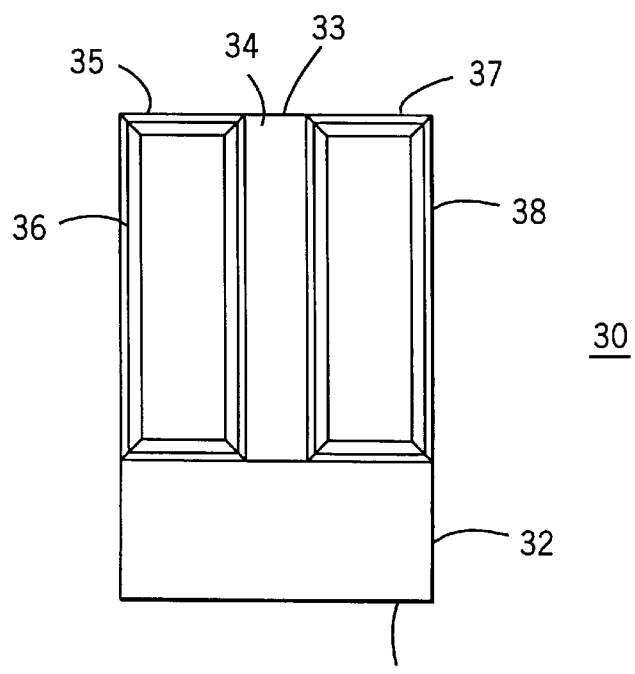
FIG. 2(b) illustrates the second sub-assembly in an assembled orientation.

FIG. 2 is a plan view of a second sub-assembly of a door; FIG. 2(a) is an exploded view of the second sub-assembly; FIG. 2(b) illustrates the second sub-assembly in an assembled orientation.

In FIG. 2, a second sub-assembly 30 is illustrated as including a center rail 32, a center mullion 34, a first center panel 36 and a second center panel 38.

In its assembled condition, illustrated in FIG. 2(b), second sub-assembly 30 is illustrated as having center mullion 34, first center panel 36, and second center panel 38 interference-fitting with top side 39 of center rail 32 in a manner similar to the interference-fit described above with respect to first sub-assembly 10. In the preferred embodiment of the present invention, top edge 33 of center mullion 34, top edge 35 of first center panel 36, and top edge 37 of second center panel 38 are configured to interference-fit with bottom side 25 of second top rail 14 (FIG. 1) in an assembled door. Similarly, bottom side 31 of center rail 32 is configured to receive a next lower adjacent sub-assembly in an interference-fit in an assembled door.

Figure 3A:
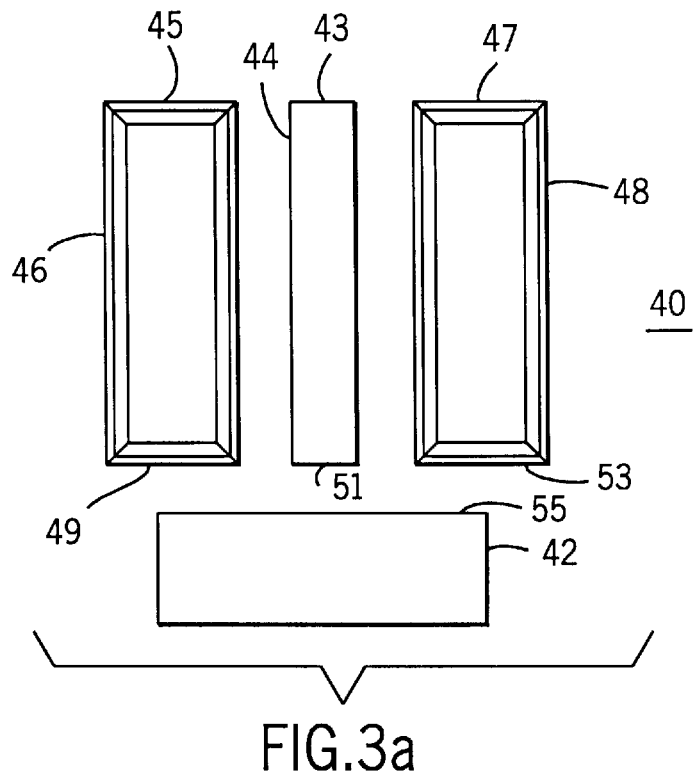
FIG. 3(a) is an exploded view of the third sub-assembly.
Figure 3B:
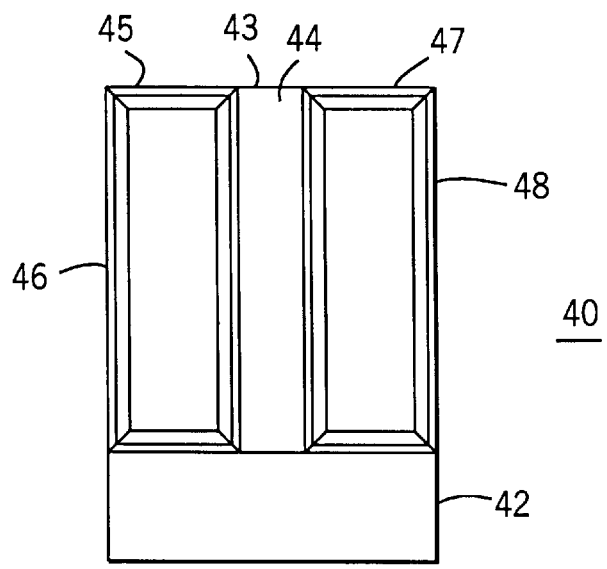
FIG. 3(b) illustrates the third subassembly in an assembled orientation.

FIG. 3 is a plan view of a third sub-assembly of a door; FIG. 3(a) is an exploded view of the third sub-assembly; FIG. 3(b) illustrates the third sub-assembly in an assembled orientation. In FIG. 3, a third sub-assembly 40 is illustrated as including a bottom rail 42, a bottom mullion 44, a first bottom panel 46, and a second bottom panel 48. A top edge 43 of bottom mullion 44, a top edge 45 of first bottom panel 46, and a top edge 47 of second bottom panel 48 are configured to interference-fittingly engage a slot (not shown)

in bottom side 31 of center rail 32 (FIG. 2). Similarly, bottom edge 49 of first bottom panel 46, bottom edge 51 of bottom mullion 44, and bottom edge 53 of second bottom panel 48 are configured to interference-fittingly engage a slot (not shown) in top side 55 of bottom rail 42.

FIG. 4 is a plan view of a door component which incorporates the first, second, and third sub-assemblies illustrated in FIGS. 1–3; FIG. 4(a) illustrates the door component in an exploded view; FIG. 4(b) illustrates the door component in an assembled orientation.

In FIG. 4, a door component 60 is illustrated as including first sub-assembly 10, second sub-assembly 30, and third sub-assembly 40. When door component 60 is assembled (FIG. 4(b)), top edges 33, 35, 37 of second sub-assembly 30 interference-fittingly engage bottom side 25 of second top rail 14 of first sub-assembly 10; and top edges 43, 45, 47 of third sub-assembly 40 interference-fittingly engage bottom side 31 is center rail 32 of second sub-assembly 30. Accordingly, in the assembled door component 60 (FIG. 4(b)), first top panel 18, second top panel 20, and top mullion 16 are interference-fit, floatingly retained intermediate first top rail 12 and second top rail 14; center mullion 34, first center panel 36, and second center panel 38 are interference-fit, floatingly retained intermediate second top rail 14 and center rail 32; and bottom mullion 44, first bottom panel 46, and second bottom panel 48 are interference-fit, floatingly retained intermediate center rail 32 and bottom rail 42.

It is worthy of note that, up to this point of completing assembly of door component 60 in constructing a door, no affixation of components with respect to each other occurs other than interference-fit, floating interfitting of components.

FIG. 5 is a plan view of an assembled door; FIG. 5(a) illustrates the door in an exploded view; FIG. 5(b) illustrates the door in an assembled orientation.

In FIG. 5, a door 70 is illustrated as including door component 60, a first stile 72 and a second stile 74.

In the preferred embodiment of the present invention, first stile 72 is affixed by adhesive in a coped interface between door component 60 and inner side 76 of first stile 72 only at edge 80 of first top rail 12, at edge 82 of second top rail 14, at edge 84 of center rail 32, and at edge 86 of bottom rail 42. In the most preferred embodiment of the present invention, inner side 76 of first stile 72 is configured to interference-fittingly receive edge 90 of first top panel 18, edge 92 of first center panel 36, and edge 94 of first bottom panel 46.

Similarly, in the preferred embodiment of the present invention, inner side 78 of second stile 74 is configured to be affixed by adhesive in a coped interface between door component 60 and inner side 78 of second stile 74 only at edge 81 of first top rail 12, at edge 83 of second top rail 14, at edge 85 of center rail 32, and at edge 87 of bottom rail 42. Further, in the most preferred embodiment of the present invention, inner side 78 of second stile 74 is configured to interference-fittingly receive edge 91 of second top panel 20, edge 93 of second center panel 38, and edge 95 of second bottom panel 48.

The inventor has found that the structure described accommodates constructing a door without additional components found in prior art doors, such as dowels-in-apertures or threaded fasteners, to strengthen adhesively joined joints.

During assembly of door 70 as illustrated in FIG. 5, the components of door 70 are compressively urged together to seat the various interference-fittingly engaged components, and to seat the adhesively treated coped interfaces described above. The required compressive urging is effected substantially parallel with a first axis 100 and substantially parallel with a second axis 102. First axis 100 and second axis 102 are preferably substantially perpendicular, and the compressive forces applied substantially parallel with axes 100, 102 are of sufficient strength to substantially fully seat the various components to render door 70 a substantially squared assembly with respect to axes 100, 102. The requisite compressive forces are applied for a duration sufficient to allow the adhesive employed to at least set sufficiently to allow handling of door 70 in order to move or otherwise handle door 70. Such handling may be necessary, for example, in an in-line manufacturing environment to move door 70 to a location where full setting of the adhesive may occur. Preferably, first sub-assembly 10, second sub-assembly 30, and third sub-assembly 40 are each individually squared with respect to axes 100, 102 before compression for seating and squaring in assembly with stiles 72, 74.

FIG. 6 is a top schematic view of an apparatus for assembling the door of the present invention according to the method of the present invention.

FIG. 7 is a side schematic view of an apparatus for assembling the door of the present invention according to the method of the present invention.

In FIGS. 6 and 7, a conveyor 110 is supported on a plurality of rollers 112. Conveyor 110 is oriented to transport successive first sub-assemblies 10, 10', successive second sub-assemblies 30, 30', and successive third sub-assemblies 40, 40' appropriately to facilitate assembly of successive door components 60. Successive door components 60 are assembled with successive first stiles 72 and successive second stiles 74. In such manner, successive doors 70 are produced and stored for further transfer to customers.

Thus, in FIGS. 6 and 7, a first sub-assembly storage bin 114 stores a plurality of first top rails 12, a plurality of first top panels 18, a plurality of second top panels 20, a plurality of top mullions 16, and a plurality of second top rails 14. The apparatus of FIGS. 6 and 7 is configured to pick individual components from first sub-assembly storage bin 114 appropriately to successively assemble parts for successive first sub-assemblies 10, 10'. The successive first sub-assemblies 10, 10' are compressively urged together to effect interference-fitting engagement among components appropriate to produce successive first sub-assemblies 10, 10'.

Thus, a first sub-assembly 10 is comprised of a particular first top rail 12, a particular first top panel 18, a particular second top panel 20, a particular top mullion 16, and a particular second top rail 14. The various components included in first sub-assembly 10 are received on conveyor 110 from first sub-assembly storage bin 114 having been picked from first sub-assembly storage bin 114 and compressively urged together to effect the interference-fitting engagement described above in connection with FIG. 1 with respect to first sub-assembly 10. Substantially simultaneously with picking of components for and compressive interference-fitting engagement of components for first sub-assembly 10, appropriate components for a second sub-assembly 30 and a third sub-assembly 40 are also picked and compressively urged together to effect the required interference-fitting engagement assembly of the appropriate various components. Thus, a second sub-assembly storage bin 116 contains a plurality of center rails 32, a plurality of center mullions 34, a plurality of first center panels 36, and a plurality of second center panels 38. A sub-assembly 30 is assembled by effecting interference-fitting engagement among a particular center rail 32, a particular center mullion 34, a particular first center panel 36, and a particular second center panel 38.

A third sub-assembly storage bin 118 stores a plurality of bottom rails 42, a plurality of bottom mullions 44, a plurality of first bottom panels 46, and a plurality of second bottom panels 48. A third sub-assembly 40 is assembled by effecting interference-fitting engagement among a particular bottom panel 42, a particular bottom mullion 44, a particular first bottom panel 46, and a particular second bottom panel 48.

Preferably, each respective component of each respective sub-assembly is stored in and dispensed from its own respective storage means.

Conveyor 110 conveys first sub-assembly 10, second sub-assembly 30, and third sub-assembly 40, away from storage bins 114, 116, 118, thereby leaving room on conveyor 110 for a subsequent assembly of a next first sub-assembly 10', a next second sub-assembly 30' and a next third sub-assembly 40', as indicated in FIGS. 6 and 7.

A first stile storage bin 120 stores a plurality of first stiles 72, and a second stile storage bin 122 stores a plurality of second stiles 74 in position adjacent an assembled door component 60. Door component 60 is preferably assembled in interference-fitting engagement of its various components (as described above in connection with FIGS. 1–4) by cooperative operation of longitudinal compression fences 124, 126 compressively urging door component 60 together. Longitudinal compression fences 124, 126 move substantially parallel with longitudinal axis 100 to longitudinally compressively urge together door component 60. A lateral compression fence 128 and a mating lateral compression fence not visible in FIGS. 6 and 7 operate substantially parallel with lateral axis 102 to laterally compressively urge together door component 60.

Preferably, first sub-assembly 10, second sub-assembly 30, and third sub-assembly 40 are each individually squared with respect to axes 100, 102 before compression for seating and squaring in assembly with stiles 72, 74.

Thus, similar two-dimensional compression units are employed to compressively urge first sub-assemblies 10, 10' second sub-assemblies 30, 30' and third sub-assemblies 40, 40' together. A first pick-and-compress unit 130 successively picks sets of components 12, 14, 16, 18, 20 from first sub-assembly storage bin 114 and compressively effects interference-fit engagement of those components to successively produce first sub-assemblies 10, 10'. A second pick-and-compress unit 132 successively picks sets of components 32, 34, 36, 38 from second sub-assembly storage bin 116 and compressively effects interference-fit engagement of those components to successively produce second sub-assemblies 30, 30'. A third pick-and-compress unit 134 successively picks sets of components 42, 44, 46, 48 from third sub-assembly storage bin 118 and compressively effects interference-fit engagement of those components to successively produce third sub-assemblies 40, 40'.

Compression of first sub-assembly 10, second sub-assembly 30 and third sub-assembly 40 together to form door component 60 may occur at any location between third sub-assembly storage bin 118 and stile storage bins 120, 122. Preferably, compression to assemble a door component 60 and compression to affix stiles 72, 74 to door component 60 is effected at a single site along conveyor 110, as illustrated in FIGS. 6 and 7. Stile picking units (not shown) associated with stile storage bins 120, 122 pick a particular first stile 72 and a particular second stile 74 for assembly with a respective door component 60 as successive door components 60 progress along conveyor 110. Thus, adhesive is applied by an adhesive applicator (not shown) to at least one of rails 12, 14, 32, 42 and selected portions of stiles 72, 74 (as described in detail in connection with FIG. 5). Preferably, adhesive is only applied to ends of rails 12, 14, 32, 42. Lateral compression fence 128 and its companion lateral compression fence cooperate with longitudinal compression fences 124, 126 to compressively urge stiles 72, 74 and door component 60 together in directions substantially parallel with axes 100, 102. The compressive urging is maintained for a time appropriate to allow adhesive bonds to set sufficiently to maintain the inter-component relationships thereby established. Successive doors 70 progress further along conveyor 110 to a stacked storage bin 136 where successive completed doors 70 are stored for further adhesive curing. Stacked storage bins 136 may be portable so that completed doors 70 may be transported to shipping, storage, or other areas in a manufacturing plant. Preferably, successive doors 70 continue along an extended conveyor run (not shown) and are subjected to compressive forces by clamps, or snugging guides, or the like for a sufficient time to allow adequate curing of adhesive bonds to withstand handling necessary to process and ship doors 70.

It is to be understood that, while the detailed drawings and specific examples given describe preferred embodiments of the invention, they are for the purpose of illustration only, that the apparatus and method of the invention are not limited to the precise details and conditions disclosed, and that various changes may be made therein without departing from the spirit of the invention which is defined by the following claims.

I claim:

1. A method of in-line manufacturing of a plurality of doors; the method comprising the steps of:

(a) fashioning a plurality of rails;
   (b) fashioning a plurality of panels;
   (c) fashioning a plurality of mullions;
   (d) fashioning a plurality of stiles;
   (e) conveying selected rails of said plurality of rails, selected panels of said plurality of panels, and selected mullions of said plurality of mullions to a plurality of different locations, and pre-assembling the selected rails, selected panels and selected mullions into a plurality of sub-assemblies, with one sub-assembly being assembled at each of said plurality of different locations; each respective sub-assembly of said plurality of sub-assemblies having at least one respective selected rail, at least one respective selected panel, and at least one respective selected mullion;
   (f) positioning said plurality of sub-assemblies intermediate a first stile of said plurality of stiles and a second stile of said plurality of stiles in a pre-assembly orientation; said plurality of sub-assemblies, said first stile, and said second stile being generally coplanar in said pre-assembly orientation; and
   (g) while in said pre-assembly orientation, compressively urging together said plurality of sub-assemblies, said first stile, and said second stile in two substantially perpendicular axes; said compressive urging substantially seating and joining said plurality of sub-assemblies, said first stile, and said second stile to one another thereby creating a substantially squared door with respect to said two axes; said plurality of sub-assemblies being affixed to said first stile along at least a portion of said first stile; said plurality of sub-assemblies being affixed to said second stile along at least a portion of said second stile; said plurality of sub-assemblies being attached to one another intermediate said first stile and said second stile.

2. The method as recited in claim 1 wherein each said respective sub-assembly has said at least one respective selected panel slottingly received within said at least one respective selected rail and said at least one respective selected mullion thereby effecting an interference fitted relationship therebetween.

3. The method as recited in claim 1 wherein each said respective sub-assembly has said at least one respective selected panel slottingly received within said at least one respective selected rail thereby effecting an interference fitted relationship therebetween.

4. The method as recited in claim 1 wherein at least one sub-assembly of said plurality of sub-assemblies is substantially squared with respect to said two axes before being situated in said preassembly orientation.

5. A method of in-line manufacturing of a plurality of doors, the method comprising the steps of:
   (a) conveying a first rail-set of a plurality of rails, a first mullion-set including at least one mullion of a plurality of mullions, and a first panel-set of a plurality of panels to a first location;
   (b) assembling the first rail-set, the first mullion-set and the first panel-set into a first sub-assembly at the first location;
   (c) conveying a second rail-set including at least one rail of a plurality of rails, a second mullion-set of a plurality of mullions, and a second panel-set of a plurality of panels to a second location, different from the first location;
   (d) assembling the second rail-set, the second mullion-set and the second panel-set into a second sub-assembly at the second location;
   (e) conveying a third rail-set including at least one rail of a plurality of rails, a third mullion-set of a plurality of mullions, and a third panel-set of a plurality of panels to a third location, different from the first and the second location;
   (f) assembling the third rail-set, the third mullion-set and the third panel-set into a third sub-assembly at the third location;
   (g) assembling first and second stiles of a stile-set with the first sub-assembly, the second sub-assembly, and the third sub-assembly, thereby creating a fourth sub-assembly; and
   (h) compressing the fourth sub-assembly in two substantially perpendicular axes, thereby substantially squaring and planarizing the fourth sub-assembly, with respect to the two axes, and thereby creating a door of the plurality of doors.

6. The method of claim 5 further comprising the step of providing the stile-set of a plurality of stiles.

7. The method of claim 6 wherein the step of providing the stile-set also includes the step of applying an adhesive to the first stile and the second stile of the stile-set and step (g) includes causing the adhesive to adhesively bond the first stile and the second stile to the first sub-assembly, the second sub-assembly and the third sub-assembly.

8. The method of claim 5 wherein the step of assembling the first sub-assembly comprises creating an interference fit between the rails and the panels of the first sub-assembly.

9. A method of in-line manufacturing of a plurality of doors, each door including a plurality of rails, a plurality of mullions, a plurality of panels, and a plurality of stiles, the method comprising the steps of:
   (a) providing a first rail-set of a plurality of rails, a first mullion-set including at least one mullion, and a first panel-set of a plurality of panels;
   (b) conveying the first rail-set, the first mullion-set and the first panel-set to a first location, and assembling at the first location the first rail-set, the first mullion-set and the first panel-set into a first sub-assembly which is substantially symmetrical with respect to a first plane, the first sub-assembly including a first top rail and a second top rail of the first rail-set, a first top panel and a second top panel of the first panel-set, and a first top mullion of the first mullion-set, the first top rail and the second top rail interference fittingly engaging the first top panel and the second top panel intermediate the first top rail and the second top rail, the first top rail and the second top rail interference fittingly engaging the first top mullion intermediate the first top rail and the second top rail, the first top panel and the second top panel interference fittingly engaging the first top mullion intermediate the first top panel and the second top panel;
   (c) providing a second rail-set including at least one rail, a second mullion-set including at least one mullion, and a second panel-set of a plurality of panels;
   (d) conveying the second rail-set, the second mullion-set and the second panel-set to a second location, different from the first location, and assembling at the second location the second rail-set, the second mullion-set and the second panel-set into a second sub-assembly which is substantially symmetrical with respect to a second plane, the second sub-assembly including a first center rail of the second rail-set, a first center panel and a second center panel of the second panel-set, and a first center mullion of the second mullion-set, the first center rail interference fittingly engaging the first center panel and the second center panel on a first side of the first center rail, the first center rail interference fittingly engaging the first center mullion on the first side of the first center rail, the first center panel and the second center panel interference fittingly engaging the first center mullion intermediate the first center panel and the second center panel;
   (e) fashioning a third rail-set including at least one rail, a third mullion-set including at least one mullion, and a third panel-set of a plurality of panels;
   (f) conveying the third rail-set, the third mullion-set and the third panel-set to a third location, different from the first and the second location, and assembling at the third location the third rail-set, the third mullion-set and the third panel-set into a third sub-assembly which is substantially symmetrical with respect to a third plane, the third sub-assembly including a first bottom rail of the third rail-set, a first bottom panel and a second bottom panel of the third panel-set, and a first bottom mullion of the third mullion-set, the first bottom rail interference fittingly engaging the first bottom panel and the second bottom panel on a first side of the first bottom rail, the first bottom rail interference fittingly engaging the first bottom mullion on the first side of the first bottom rail, the first bottom panel and the second bottom panel interference fittingly engaging the first bottom mullion intermediate the first bottom panel and the second bottom panel;
   (g) providing a stile-set of a plurality of stiles;
   (h) assembling a first stile of the stile set and a second stile of the stile set with the first sub-assembly, the second sub-assembly, and the third sub-assembly, thereby creating a fourth sub-assembly, the first plane, the second plane, the third plane, the first stile, and the second stile being substantially coplanar when assembled in the fourth sub-assembly, the first stile being affixed with a first side of the first sub-assembly, being affixed with a first side of the second sub-assembly, and being affixed with a first side of the third sub-assembly, the second stile being affixed with a second side of the first sub-assembly, being affixed with a second side of the second sub-assembly, and being affixed with a second side of the third sub-assembly, the second top rail interference fittingly engaging the first center panel, the second center panel and the first center mullion, the first center rail interference fittingly engaging the first bottom panel, the second bottom panel and the first bottom mullion; and (i) compressing the fourth sub-assembly in two substantially perpendicular axes thereby squaring and planarizing the fourth sub-assembly, with respect to the two axes, and thereby creating a door of the plurality of doors.

10. The method as recited in claim 9, wherein the interference fittingly engaging of the first and second top panels with the first and second top rails and the first top mullion includes, slottingly receiving the first and second top panels within the first and second top rails and the first top mullion.

11. The method as recited in claim 10, wherein the interference fittingly engaging of the first and second center panels with the first center rail and the first center mullion includes, slottingly receiving the first and second center panels within the first center rail and the first center mullion.

12. The method as recited in claim 11, wherein the interference fittingly engaging of the first and second bottom panels with the first bottom rail and the first bottom mullion includes, slottingly receiving the first and second bottom panels within the first bottom rail and the first bottom mullion.

13. The method as recited in claim 10, wherein the interference fittingly engaging of the first and second bottom panels with the first bottom rail and the first bottom mullion includes, slottingly receiving the first and second bottom panels within the first bottom rail and the first bottom mullion.

14. The method as recited in claim 9, wherein the interference fittingly engaging of the first and second center panels with the first center rail and the first center mullion includes, slottingly receiving the first and second center panels within the first center rail and the first center mullion.

15. The method as recited in claim 9, wherein the interference fittingly engaging of the first and second bottom panels with the first bottom rail and the first bottom mullion includes, slottingly receiving the first and second bottom panels within the first bottom rail and the first bottom mullion.

16. A method for in-line assembly of a multi-panel door, comprising the steps of:

(a) conveying a first top rail and a second top rail, a first top panel and a second top panel, and a first top mullion to a first location, and at the first location interference fitting the first top rail and the second top rail with the first top panel and the second top panel, interference fitting the first top rail and the second top rail with the first top mullion, and interference fitting the first top panel and the second top panel with the first top mullion, thereby forming a first sub-assembly;

(b) conveying a first center rail, a first center panel and a second center panel, and a first center mullion to a second location that is different from the first location, and at the second location interference fitting the first center rail with the first center panel and the second center panel, interference fitting the first center rail with the first center mullion, and interference fitting the first center panel and the second center panel with the first center mullion, thereby forming a second sub-assembly;

(c) conveying a first bottom rail, a first bottom panel and a second bottom panel, and a first bottom mullion to a third location that is different from the first location and the second location, and at the third location interference fitting the first bottom rail with the first bottom panel and the second bottom panel, interference fitting the first bottom rail with the first bottom mullion, and interference fitting the first bottom panel and then second bottom panel with the first bottom mullion, thereby forming a third sub-assembly; and then (d) assembling the first sub-assembly to the second sub-assembly, assembling the second sub-assembly to the third sub-assembly, assembling a first stile to the first, second and third sub-assemblies, and assembling a second stile to the first, second and third sub-assemblies.

17. The method as recited in claim 16, wherein assembling of the first and second stiles to the first, second and third sub-assemblies includes adhesively bonding the first and second stiles to the first and second top rails, the first center rail, and the first bottom rail.

18. The method as recited in claim 17, wherein the adhesively bonding step includes applying adhesive only to ends of the first top rail, the second top rail, the first center rail, and the first bottom rail.

19. The method as recited in claim 16, and further including the step of compressing the first sub-assembly, the second sub-assembly, the third sub-assembly, the first stile and the second stile against one another along two substantially perpendicular axes, thereby substantially squaring and planarizing the first sub-assembly, the second sub-assembly, the third sub-assembly, and the first and second stiles with respect to the two axes.

* * * * *